US010825592B2

(12) United States Patent
Onodera (10) Patent No.: US 10,825,592 B2
(45) Date of Patent: Nov. 3, 2020

(54) METHOD FOR PRODUCING SOFT MAGNETIC MATERIAL

(71) Applicant: TOYOTA JIDOSHA KABUSHIKI KAISHA, Toyota (JP)

(72) Inventor: Kiyotaka Onodera, Miyoshi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 148 days.

(21) Appl. No.: 16/189,167

(22) Filed: Nov. 13, 2018

(65) Prior Publication Data

US 2019/0172617 A1 Jun. 6, 2019

(30) Foreign Application Priority Data

Dec. 6, 2017 (JP) ................. 2017-234421

(51) Int. Cl.
| | | |
|---|---|---|
| *C22C 45/02* | (2006.01) | |
| *H01F 1/153* | (2006.01) | |
| *C22C 33/00* | (2006.01) | |
| *C22C 38/16* | (2006.01) | |
| *B32B 15/01* | (2006.01) | |

(52) U.S. Cl.
CPC ....... *H01F 1/15308* (2013.01); *B32B 15/013* (2013.01); *B32B 15/015* (2013.01); *C22C 33/003* (2013.01); *C22C 38/16* (2013.01); *C22C 45/02* (2013.01); *H01F 1/15333* (2013.01)

(58) Field of Classification Search
CPC ... B32B 15/013; B32B 15/015; C22C 33/003; C22C 45/02; H01F 1/15308; H01F 1/15333
USPC ......................................... 148/304
See application file for complete search history.

(56) References Cited

U.S. PATENT DOCUMENTS

| | | | |
|---|---|---|---|
| 2003/0145910 A1* | 8/2003 | Mochizuki | H01F 1/059 148/302 |
| 2009/0266448 A1 | 10/2009 | Ohta et al. | |
| 2019/0185950 A1* | 6/2019 | Onodera | H01F 1/153 |

FOREIGN PATENT DOCUMENTS

| | | |
|---|---|---|
| JP | 2001-118727 A | 4/2001 |
| JP | 2013-060665 A | 4/2013 |
| WO | 2018/025931 A1 | 2/2018 |

* cited by examiner

*Primary Examiner* — Jie Yang
(74) *Attorney, Agent, or Firm* — Oliff PLC (57) ABSTRACT

It is an object of the present disclosure to produce a soft magnetic material having high saturation magnetization by heat-treating a Fe-based amorphous alloy, without needing the control of the atmosphere. The present disclosure provides a method for producing a soft magnetic material, including heat treating a Fe-based amorphous alloy in a state in which the alloy is wrapped with a sheet comprising one or more substances having a standard Gibbs energy of formation of an oxide thereof that is larger in a negative direction than Fe, to form a crystal phase.

3 Claims, 4 Drawing Sheets

METHOD FOR PRODUCING SOFT MAGNETIC MATERIAL

CROSS REFERENCE TO RELATED APPLICATIONS

The present application claims priority from Japanese patent application JP 2017-234421 filed on Dec. 6, 2017, the content of which is hereby incorporated by reference into this application.

BACKGROUND

Technical Field

The present disclosure relates to a method for producing a soft magnetic material.

Background Art

To improve the performance of components such as a motor and a reactor, a soft magnetic material used in the core of the component desirably has both high saturation magnetization and low coercive force.

As a soft magnetic material having high saturation magnetization, a Fe-based nanocrystalline soft magnetic material has been known. The Fe-based nanocrystalline soft magnetic material means a soft magnetic material comprising Fe as a main component, wherein, in the material, 30% by volume or more of nanocrystals are dispersed.

The Fe-based nanocrystalline soft magnetic material can be produced by performing a heat treatment, in which a Fe-based amorphous alloy comprising Fe as a main component is heated to a crystal formation temperature range and is then cooled. For example, JP 2013-60665 A discloses that a Fe-based alloy (Fe—Cu—B, Fe—Cu—B—Si) having a tissue, in which crystal grains having a mean particle diameter 30 nm or less are dispersed at a volume fraction of 3% or more and less than 30% in an amorphous matrix, is heat-treated to obtain a soft magnetic alloy.

SUMMARY

JP 2013-60665 A discloses the heat treatment of the above-described Fe-based alloy (Fe—Cu—B, Fe—Cu—B—Si) is carried out in inert gas such as nitrogen gas, argon gas or helium. However, in order to control the atmosphere, a step therefor is necessary. In addition, large-scale equipment is also necessary for controlling the atmosphere.

The present inventors have found for the first time that, when a Fe-based nanocrystalline soft magnetic material is produced by heat-treating a Fe-based amorphous alloy in the atmosphere, without controlling the atmosphere, it may cause problems such as formation of an oxide layer on the surface of the soft magnetic material, a decrease in saturation magnetization, and deterioration of magnetic properties.

The present inventors have conducted intensive studies for the purpose of producing a soft magnetic material having high saturation magnetization by heat-treating a Fe-based amorphous alloy, without needing the control of the atmosphere, thereby completing the present disclosure.

The present disclosure provides a method for producing a soft magnetic material, comprising heat-treating a Fe-based amorphous alloy to form a crystal phase, wherein the heat-treating is carried out in a state in which the alloy is wrapped with a sheet comprising one or more substances having a standard Gibbs energy of formation of an oxide thereof that is larger in a negative direction than Fe.

According to the above-described method, since the formation of an oxide layer on the surface of a soft magnetic material is suppressed in the heat-treating, a soft magnetic material having high saturation magnetization can be produced. The above-described heat-treating s able to suppress the formation of an oxide layer on the surface of a soft magnetic material, even in a case where the heat-treating is carried out in an atmosphere containing a high concentration of oxygen, such as in the air, without controlling the atmosphere.

Examples of one or more substances having a standard Gibbs energy of formation of an oxide thereof that is larger in a negative direction than Fe, which may be used in the above-described method in some embodiments, may include one or more selected from the group consisting of Ti, Si, Al and Zr.

In one or more embodiment of the above-described method,
the alloy is a ribbon of Fe-based amorphous alloy, and
the heat-treating comprises sandwiching a heat treatment sample comprising the ribbon wrapped with the sheet between a pair of heating bodies from the both sides of the thickness direction of the ribbon, wherein each heating body comprises a heating surface that comes into contact with the heat treatment sample to heat it, and the heating bodies are disposed such that the heating surfaces face to each other.

In these embodiments, since heat can be efficiently transferred to the ribbon wrapped with the sheet, it is easy to control the temperature during the heat treatment.

In another embodiment of the above-described method, the above-described heat-treating is carried out in the atmosphere.

When the heat-treating is carried out in the atmosphere, controlling the atmosphere may not be necessary, and thus, it is favorable.

According to the present disclosure, without needing to control the atmosphere to an oxygen concentration lower than the air, a soft magnetic material having high saturation magnetization can be produced by heat-treating a Fe-based amorphous alloy.

DETAILED DESCRIPTION

Hereinafter, embodiments of the method for producing a soft magnetic material of the present disclosure will be specifically described. However, the following embodiments are not intended to limit the scope of the present disclosure.

<Fe-Based Amorphous Alloy>

In the present disclosure, the term "Fe-based amorphous alloy" or "Fe-based alloy" means an amorphous alloy or an alloy comprising Fe as a main component. Herein, the phrase "comprising Fe as a main component" may mean that the content of Fe in the alloy is 50 atomic % or more. From the viewpoint that the soft magnetic material obtained by heat-treating the Fe amorphous alloy has high saturation magnetization, the content of Fe in the Fe amorphous alloy may be 80 atomic % or more, 84 atomic % or more, or 88 atomic % or more in one or more embodiment. In the present description, the "Fe-based amorphous alloy" or the "Fe-based alloy" may simply be referred to as an "amorphous alloy" or "alloy" in some cases.

In the present disclosure, the term "amorphous alloy" or "alloy having an amorphous phase" may mean a Fe-based amorphous alloy comprising 50% by volume or more of an amorphous phase. By heat-treating the Fe-based amorphous alloy in a crystallization temperature range and then cooling it, a crystal phase is generated from the amorphous phase. From the viewpoint of obtaining a larger number of fine crystal phases by the heat treatment, the content of the amorphous phase in the Fe-based amorphous alloy may be 60% by volume or more, 70% by volume or more, 80% by volume or more, or 90% by volume or more in one or more embodiment.

The form of the Fe-based amorphous alloy is not particularly limited, and the Fe-based amorphous alloy may have a form such as a ribbon, a flake, a particulate, and a bulk. The form of the Fe-based amorphous alloy is a ribbon in some embodiments. The size of such a ribbon of Fe-based amorphous alloy is not particularly limited. The thickness of the ribbon may be 10 to 100 μm, or 10 to 50 μm in one or more embodiment. The width of the ribbon may be 1 to 200 mm in some embodiments.

The composition of the Fe-based amorphous alloy is not particularly limited. Examples of the composition may include the compositions represented by the following Composition Formula 1 and Composition Formula 2.

Composition Formula 1 is $Fe_{100-x-y}B_xM_y$. In Composition Formula 1, M represents at least one element selected from the group consisting of Nb, Mo, Ta, W, Ni, Co and Sn, and x and y satisfy $10 \leq x \leq 16$ and $0 \leq y \leq 8$. Such x and y indicate atomic %, x represents the proportion of B, and y represents the proportion of M.

Composition Formula 2 is $Fe_{100-a-b-c}B_aCu_bM'_c$. In Composition Formula 2, M' represents at least one element selected from the group consisting of Nb, Mo, Ta, W, Ni and Co, and a, b and c satisfy $10 \leq a \leq 16$, $0 \leq b \leq 2$, and $0 \leq c \leq 8$. Such a, b and c indicate atomic %, wherein a represents the proportion of B, b represents the proportion of Cu, and c represents the proportion of M'.

(Fe-Based Amorphous Alloy Having Composition Represented by Composition Formula 1)

The alloy having the composition represented by Composition Formula 1 is a Fe-based amorphous alloy comprising Fe as a main component, wherein the content of Fe is 50 atomic % or more. The content of Fe indicates the balance of B and M. From the viewpoint that the soft magnetic material obtained by heat-treating the Fe amorphous alloy has high saturation magnetization, the content of Fe in the Fe-based amorphous alloy may be 80 atomic % or more, 84 atomic % or more, or 88 atomic % or more in one or more embodiment.

The Fe-based amorphous alloy having the composition represented by Composition Formula 1 is produced by quenching a molten metal. Upon quenching the molten metal, B (boron) promotes the formation of an amorphous phase. When the content of B (the residual amount of B) in the Fe-based amorphous alloy obtained by quenching a molten metal is 10 atomic % or more, the main phase becomes an amorphous phase. The phrase "the main phase of an alloy is an amorphous phase" may mean that the content of an amorphous phase in an alloy is 50% by volume or more. In order that the main phase of an alloy can be an amorphous phase, the content of B in the amorphous alloy may be 11 atomic % or more, or 12 atomic % or more in one or more embodiment. On the other hand, if the content of B is 16 atomic % or less, when a crystal phase is generated from the amorphous phase in the heat-treating, the formation of a Fe—B compound can be avoided. From the viewpoint of avoiding the formation of a Fe—B compound, the content of B may be 15 atomic % or less, or may be 14 atomic % or less in one or more embodiment.

The Fe-based amorphous alloy represented by Composition Formula 1 may comprise M, as well as Fe and B, as necessary. M represents at least one element selected from the group consisting of Nb, Mo, Ta, W, Ni, Co and Sn.

When M is at least one element selected from the group consisting of Nb, Mo, Ta, W and Sn, grain growth from the crystal phase of the Fe-based amorphous alloy represented by Composition Formula 1 is suppressed, and an increase in coercive force is suppressed in the heat-treating, and even after the heat-treating, the amorphous phase remaining in the alloy is stabilized. However, since the amorphous alloy comprises these elements, the content of Fe is decreased, thereby reducing saturation magnetization. Accordingly, in one or more embodiment, the content of these elements in the amorphous alloy is kept as little as possible.

When M is at least one of Ni and Co in Composition Formula 1, the size of induced magnetic anisotropy can be controlled. In addition, when M is Ni, saturation magnetization can be increased.

When the amorphous alloy comprises M, it exhibits the aforementioned effects depending on the content of M. That is to say, Nb, Mo, Ta, W, Ni, Co and Sn exhibit effects such as suppression of grain growth from the crystal phase and stabilization of the amorphous phase, whereas Ni and Co also exhibit effects such as the control of the size of induced magnetic anisotropy and an increase in saturation magnetization. From the viewpoint of ensuring these effects, the content of M may be 0.2 atomic % or more, or 0.5 atomic % or more. On the other hand, when the content of M is 8 atomic % or less, Fe and B as essential elements of the amorphous alloy are not extremely reduced, and as a result, a soft magnetic material obtained by heat-treating the amorphous alloy to form a crystal phase can achieve both high saturation magnetization and low coercive force. Besides, when two or more elements are comprised as M, the content of M indicates the total content of the two or more elements.

The amorphous alloy represented by Composition Formula 1 may also comprise inevitable impurities such as S, O and N, as well as Fe, B and M. The term "inevitable impurities" means impurities, which are inevitable, or cause a significant increase in production costs to avoid them, such as impurities comprised in raw materials. The purity of the amorphous alloy represented by Composition Formula 1 comprising such inevitable impurities may be 97% by mass or more, 98% by mass or more, or 99% by mass or more.
(Fe-Based Amorphous Alloy Having Composition Represented by Composition Formula 2)

Next, Composition Formula 2 will be described below regarding points different from Composition Formula 1.

The Fe-based amorphous alloy having the composition represented by Composition Formula 2 comprises Cu as an essential component, as well as Fe and B, and further, it may comprise M', as necessary.

When the amorphous alloy comprises Cu, such Cu works as a nucleation site during the heat-treating, and heterogeneous nucleation takes place in a Cu cluster as an origin, such that the crystal phase grains are miniaturized. Even if the amorphous alloy comprises a trace amount of Cu, such Cu has a relatively large effect of miniaturizing the crystal phase grains. In order to ensure this effect, the content of Cu in the amorphous alloy may be 0.2 atomic % or more, or 0.5 atomic % or more. On the other hand, when the content of Cu in the amorphous alloy is 2 atomic % or less, the amorphous alloy can be produced by liquid quenching, without generation of a crystal phase. From the viewpoint of the embrittlement of the amorphous alloy, the content of Cu in the amorphous alloy may be 1 atomic % or less, or 0.7 atomic % or less.

The effects and content of B in the amorphous alloy represented by Composition Formula 2 are the same as described above regarding B in the amorphous alloy represented by Composition Formula 1.

The effects and content of M' in the amorphous alloy represented by Composition Formula 2 are the same as described above regarding M in the amorphous alloy represented by Composition Formula 1 (provided that, differing from M, M' cannot be Sn).

The amorphous alloy represented by Composition Formula 2 may comprise inevitable impurities such as S, O and N, as well as Fe, B, Cu and M'. The purity of the amorphous alloy represented by Composition Formula 2 comprising such inevitable impurities may be 97% by mass or more, 98% by mass or more, or 99% by mass or more.
(Method for Producing Fe-based Amorphous Alloy)

The method for producing a Fe-based amorphous alloy may be, for example, a method which comprises previously preparing an ingot containing elements that achieve a desired element composition, and quenching a molten metal, which has been obtained by melting the ingot, to obtain an amorphous alloy. When the ingot comprises elements that naturally decrease upon the melting of the ingot, an ingot having an element composition that anticipates such natural decrease of elements has been prepared. Moreover, when the ingot is crushed before the melting, the ingot may have been subjected to a homogeneous heat treatment, before it is crushed, in some embodiments.

The method of quenching a molten metal is not particularly limited, and an ordinary method may be applied.

The method of quenching a molten metal may be, for example, a single-roll method using a cooling roller, the surface layer portion of which consists of a metal such as copper or a copper alloy. The rolling speed of the cooling roller used in the single-roll method can be a standard rolling speed applied in the case of producing a Fe-based amorphous alloy, and for instance, it may be 15 m/sec or more, 30 m/sec or more, or 40 m/sec or more, and may also be 70 m/sec or less, or 80 m/sec or less. The temperature of the molten metal discharged to the cooling roller is a temperature that is 50° C. to 300° C. higher than the melting point of the ingot in some embodiments. The atmosphere applied when the molten metal is discharged is not particularly limited. From the viewpoint of reducing the mixing of an oxide and the like into the amorphous alloy, it may be an atmosphere of inert gas in some embodiments.
<Sheet Comprising One or More Substances Having Standard Gibbs Energy of Formation of Oxide Thereof that is Larger in a Negative Direction than Fe>

The present disclosure is characterized in that, in the heat-treating, the Fe-based amorphous alloy is heat-treated, in a state in which the Fe-based amorphous alloy is wrapped with a sheet comprising one or more substances having a standard Gibbs energy of formation of an oxide thereof that is larger in a negative direction than Fe, to form a crystal phase.

Herein, the phrase "one or more substances having a standard Gibbs energy of formation of an oxide thereof that is larger in a negative direction than Fe" means one or more substances, in which when the substances are oxidized at a heat treatment temperature (in particular, a maximum reaching temperature) in the heat-treating, the standard Gibbs energy of formation of an oxide generated thereby is larger in a negative direction than the standard Gibbs energy of formation of the oxide of Fe (FeO) at the same temperature as described above. The standard Gibbs energy of formation of the oxide of Fe can be compared with the standard Gibbs energy of formation of the oxide of the above-described substance as a standard Gibbs energy of formation of an oxide per mole of oxygen. Since the above-described substances are oxidized more easily than Fe in the heat-treating, if the Fe-based amorphous alloy is subjected to the heat-treating in a state in which it is wrapped with a sheet comprising the above-described substances, it becomes possible to suppress oxidation of the surface of a soft magnetic material produced from the Fe-based amorphous alloy.

The above-described substances are one or more substances, in which the standard Gibbs energy of formation at a heat treatment temperature (in particular, a maximum reaching temperature) in the heat-treating is located lower than that of Fe in an Ellingham diagram.

Specific examples of the above-described substances may include one or more selected from the group consisting of Ti, Si, Al and Zr. The substance is particularly Ti in one or more embodiments.

The sheet comprising the above-described one or more substances is not particularly limited, as long as it comprises the one or more substances. Typically, it may be a sheet comprising the one or more substances as a main component. The sheet comprising the one or more substances as a main component may be a sheet, in which the content of the one or more substances may be 50% by mass or more, 60% by weight or more, 70% by weight or more, 80% by weight or more, 90% by weight or more, 95% by weight or more, or 99% by weight or more. The sheet comprising the one or more substances may be a foil, when the one or more substances are one or more metals.

The thickness of the above-described sheet is not particularly limited. It is a thickness that does not substantially inhibit heat conduction in the heat-treating in some embodiments. Such a thickness is, for example, 10 to 200 μm. This thickness may be applicable particularly in an embodiment in which the sheet is a foil such as a titanium foil.

<Heat-Treatment>

The heat-treating comprises heat-treating the Fe-based amorphous alloy, in a state in which the Fe-based amorphous alloy is wrapped with a sheet comprising one or more substances having a standard Gibbs energy of formation of an oxide thereof that is larger than Fe in a negative direction, to form a crystal phase.

Figure 1:
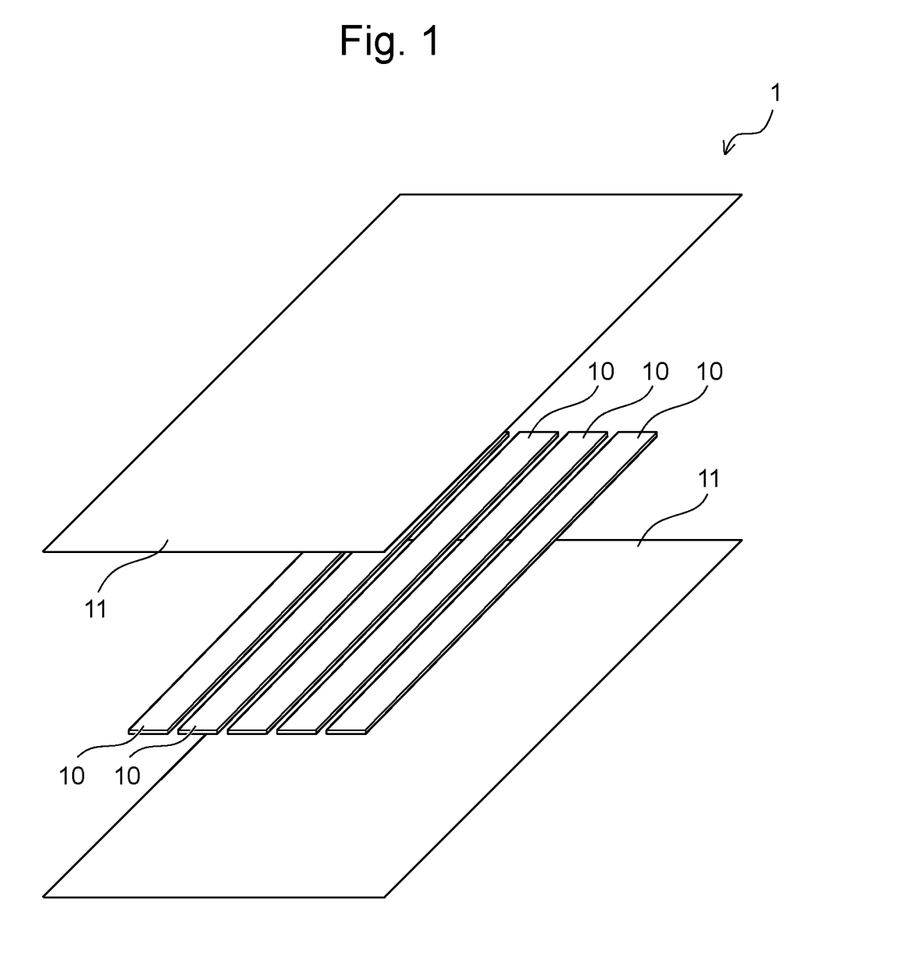
FIG. 1 is an exploded perspective view of a heat treatment sample 1, in which a plurality of Fe-based amorphous ribbons 10 are wrapped by sandwiching them between a pair of titanium foils 11, 11 (sheets each comprising one or more substances having a standard Gibbs energy of formation of an oxide thereof that is larger in a negative direction than Fe)
Figure 2:
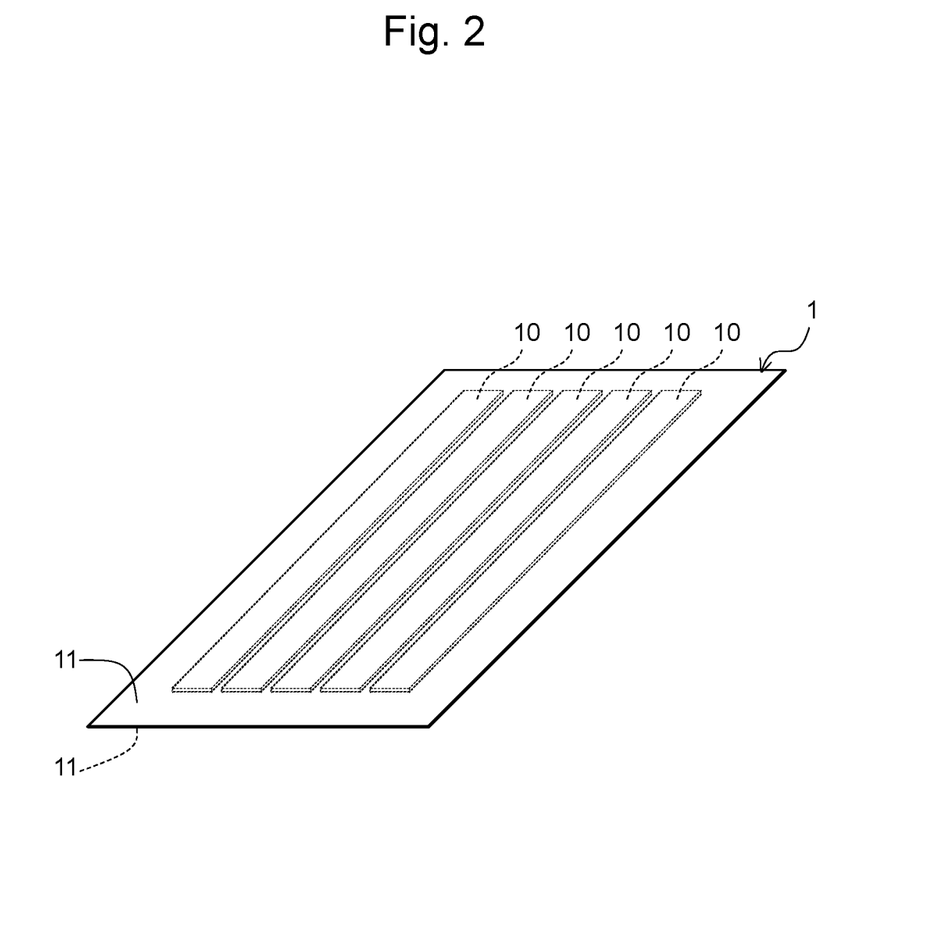
FIG. 2 is a perspective view of a heat treatment sample 1, in which a plurality of Fe-based amorphous ribbons 10 are wrapped by sandwiching them between a pair of titanium foils 11,11 (sheets each comprising one or more substances having a standard Gibbs energy of formation of an oxide thereof that is larger in a negative direction than Fe)

In one or more embodiments, the Fe-based amorphous alloy is wrapped with the above-described sheet, such that a majority of or the entire surface of a portion of the Fe-based amorphous alloy used as a soft magnetic material can be coated with the above-described sheet. Specifically, in one or more embodiments, the Fe-based amorphous alloy is wrapped with the sheet, such that 50% by area or more, 60% by area or more, 70% by area or more, 80% by area or more, 90% by area or more, 95% by area or more, 99% by area or more, or 100% by area of the surface of the portion of the Fe-based amorphous alloy used as a soft magnetic material can be coated with the above-described sheet. FIGS. 1 and 2 show a heat treatment sample 1, which is formed by sandwiching a plurality of Fe-based amorphous alloy ribbons 10 between a pair of sheets 11 each comprising one or more substances having a standard Gibbs energy of formation of an oxide thereof that is larger than Fe in a negative direction, from both sides of the thickness direction of the ribbon. In the illustrated heat treatment sample 1, a plurality of the Fe-based amorphous alloy ribbons 10, as a whole, are wrapped with the sheets 11. The illustrated heat treatment sample 1 can be subjected to a heat treatment.

In the heat-treating, the Fe-based amorphous alloy wrapped with the sheet is heated in a crystallization temperature range to form a crystal phase. According to the heat treatment, the volume fraction of the crystal phase comprising, as a main body, Fe with a bcc structure ($\alpha$Fe) is increased, magneto-striction is reduced, and iron loss is reduced.

The heat treatment temperature applied in the heat-treating is not particularly limited, as long as it is in a temperature range under which Fe can crystallize. For example, the maximum reaching temperature in the heat treatment may be in the temperature range from 300° C. to 600° C. The heat-treating may comprise cooling, after the temperature has reached the maximum temperature. In such a case, the average cooling rate may be 10° C./min to 30000° C./min, or 50° C./min to 6000° C./min. In the heat-treating, not only a single-stage heat treatment, but a multistage heat treatment or a plurality of heat treatments may also be carried out.

(Embodiment of Heat Treatment)

In one or more embodiments of the heat-treating, the heat-treating comprises heating the Fe-based amorphous alloy wrapped with the above-described sheet at a temperature-increasing rate of 10° C./sec or more, and then retaining the Fe-based amorphous alloy at a temperature equal to or higher than the temperature at which crystallization starts but lower than the temperature at which Fe—B compounds start forming, for 0 to 80 seconds. This embodiment is applicable when the Fe-based amorphous alloy has the composition represented by the above Composition Formula 1 or 2.

By setting the temperature-increasing rate to be 10° C./sec or more, the crystal phase can be miniaturized. In order to miniaturize the crystal phase, the temperature-increasing rate may be 45° C./sec or more, 125° C./sec or more, 150° C./sec or more, or 325° C./sec or more. On the other hand, from the viewpoint of economic efficiency, the temperature-increasing rate may be 415° C./sec or less. The temperature-increasing rate may be an average rate from initiation of the heating to the arrival at the maximum temperature. Otherwise, the temperature-increasing rate may be an average temperature-increasing rate in a specific temperature range. It may be, for example, an average temperature-increasing rate between 100° C. and 400° C.

When the retention time is 0 second or longer, a fine crystal phase can be obtained from the amorphous phase. It is to be noted that the phrase "the retention time is 0 second" means that the Fe-based amorphous alloy is cooled immediately after the temperature has reached the maximum temperature, or that the retention is terminated. The retention time is 3 seconds or longer in some embodiments. On the other hand, if the retention time is 80 seconds or shorter, the crystal phase can be particularly miniaturized. From the viewpoint of miniaturization of the crystal phase, the retention time may be 60 seconds or shorter, 40 seconds or shorter, 20 seconds or shorter, or 17 seconds or shorter.

When the retention temperature is equal to or higher than the temperature at which crystallization starts, the amorphous phase can be converted to a crystal phase. As the retention time is shorter, the retention temperature can be set higher. Considering the retention time, the retention temperature may be determined, as appropriate. On the other hand, if the retention temperature exceeds the temperature at which Fe—B compounds start forming, strong crystal magnetic anisotropy occurs as a result of generation of the Fe—B compound, and thereby, coercive force is increased. As such, the Fe-based amorphous alloy is retained at a temperature that does not reach the temperature at which Fe—B compounds start forming, such that the crystal phase can be miniaturized without generation of Fe—B compounds. Thus, in order to miniaturize the crystal phase, the amorphous alloy may also be retained at a temperature slightly lower than the temperature at which Fe—B compounds start forming. The temperature that is slightly lower than the temperature at which Fe—B compounds start forming may mean a temperature 5° C. or less lower than the temperature at which Fe—B compounds start forming, a temperature 10° C. or less lower than the temperature at which Fe—B compounds start forming, or a temperature 20° C. or less lower than the temperature at which Fe—B compounds start forming.

(Embodiment of Heating Method)

The heating method applied in the heat-treating is not particularly limited, as long as it is a method capable of heating the Fe-based amorphous alloy wrapped with the above-described sheet in a crystallization temperature range to form a crystal phase.

When the Fe-based amorphous alloy wrapped with the sheet is heated using an atmosphere furnace, it is effective to set the temperature-increasing rate in the atmosphere in the furnace to be higher than the desired temperature-increasing rate to the alloy. Likewise, it is effective to set the temperature in the furnace atmosphere to be higher than the desired retention temperature to the alloy. For instance, when the temperature of the above-described alloy is increased at a rate of 150° C./sec and the alloy is then retained at 500° C., it is effective to increase the temperature in the furnace atmosphere at a rate of 170° C./sec, and then to retain the temperature at 520° C.

If an infrared furnace is used instead of the atmosphere furnace, the time lag between the calorific value inputted in the infrared heater and the calorific value received by the alloy can be reduced. The infrared furnace is a furnace which reflects the light emitted from an infrared lamp at a concave surface thereof and rapidly heats an object to be heated.

Furthermore, the temperature of the alloy may be increased and then retained by heat conduction between solids.

Figure 3:
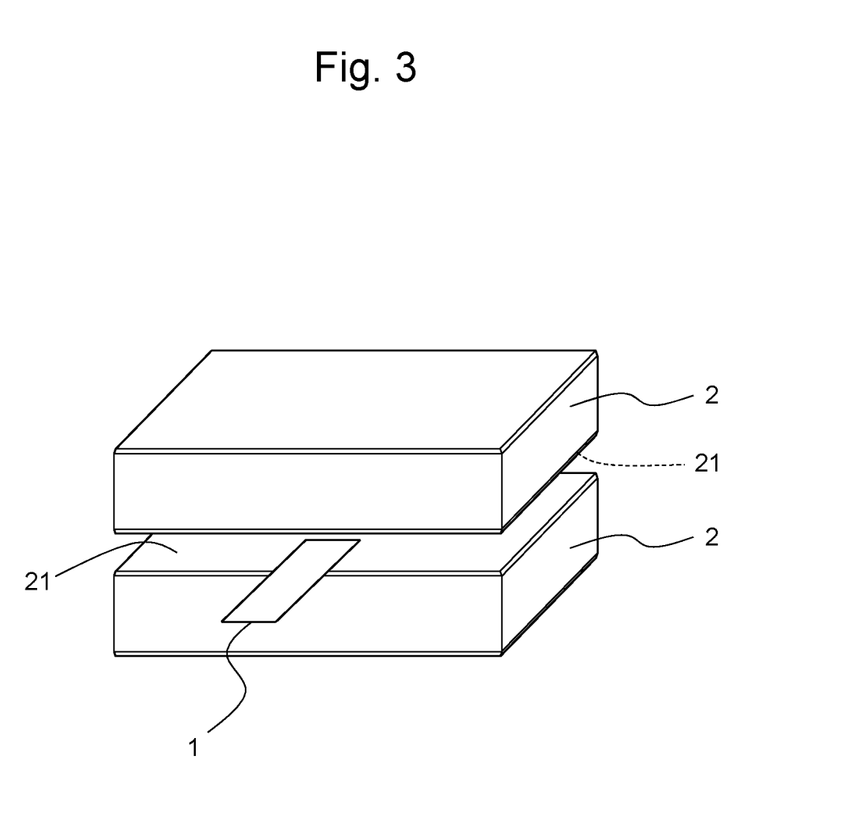
FIG. 3 is a perspective view showing an overview of an apparatus for heating a heat treatment sample 1 comprising Fe-based amorphous ribbons 10, comprising a pair of heated blocks (heating bodies) 2, 2, between which the treatment sample 1 is sandwiched.

FIG. 3 is a perspective view showing an overview of a pair of heating bodies 2, 2 for heating a heat treatment sample 1 by heat conduction between solids. The heating bodies 2, 2 are disposed such that heating surfaces 21, 21 of them, each of which is contacted with the heat treatment sample 1 to heat it, face to each other. The heat treatment sample 1 is sandwiched by the pair of heating bodies 2, 2 from both sides of the thickness direction of ribbons 10 in the heat treatment sample 1, such that the ribbons 10 in the heat treatment sample 1 can be efficiently heated. The heating body 2 may be a block that has previously been heated to the desired heat treatment temperature in the furnace, or the heating body 2 itself may store a heating element and the heating surface 21 may be heated by the heat from the heating element. The material of a part of the heating body 2 constituting the heating surface 21 is not particularly limited. Examples of such a material include a metal, an alloy, and a ceramic. In an embodiment in which the heating body 2 is a block, the material of the block may be a metal, an alloy, a ceramic, or the like.

When the heat treatment sample 1 comprising Fe-based amorphous alloy ribbons is heated using the pair of heating bodies 2,2, the Fe-based amorphous alloy in the heat treatment sample 1 can be rapidly heated, and a crystal phase can be easily miniaturized.

Moreover, when the Fe-based amorphous alloy is heated by rapidly increasing the temperature, the Fe-based amorphous alloy itself generates heat due to the heat released upon crystallization of the amorphous phase. In the heating method using an atmosphere furnace, an infrared furnace or the like, the temperature of the Fe-based amorphous alloy may become higher than the desired temperature, which may easily result in the coarsening of the crystal phase. In contrast, as shown in FIG. 3, when the heat treatment sample 1 comprising Fe-based amorphous alloy ribbons is heated using the pair of heating bodies 2, 2, it is easy to control the temperature, while taking into consideration the self-heating of the Fe-based amorphous alloy, and also, it is easy to heat the Fe-based amorphous alloy at an intended temperature. Accordingly, the coarsening of the crystal phase can be avoided.

<Soft Magnetic Material>

In the soft magnetic material obtained via the above-described heat-treating, the mean particle diameter of the crystal grains of αFe (measured according to a Scherrer method) is typically 30 nm or less, and in a further embodiment, the soft magnetic material comprises 30% by volume or more of the crystal phase.

EXAMPLES

Hereinafter, the embodiments of the present disclosure will be specifically described in the following examples. However, these examples are not intended to limit the scope of the present disclosure.

(Production of Fe-Based Amorphous Alloy)

Raw materials (Fe, B and Ni) were weighed to have the composition of $Fe_{84}B_{12}Ni_3$, and were then melted and blended according to arc melting. In order to homogeneously blend the raw materials, the melting was repeated four times, while reversing them. After completion of the blending, the mixture was poured into a mold to produce an ingot of alloy.

The produced alloy ingot was cut, such that it could be inserted into a quartz nozzle (discharge aperture φ0.5 mm). The thus cut ingot was inserted into the quartz nozzle, and the nozzle was then equipped in a liquid quenching apparatus (single-roll method). The ingot was melted by radiofrequency heating in an inert atmosphere, to obtain a molten metal. Thereafter, the molten metal was discharged to a copper roller with a rotation speed of 60 m/s, to produce a ribbon with a width of 1 mm and a thickness of 13 μm. The distance between the quartz nozzle and the copper roller was set at 0.4 mm, the molten metal-discharging temperature was set at a melting point +100° C., and the pressure difference upon the discharge was set at 60 kPa. For the production of the ribbon, a liquid quenching apparatus was used, in which the quartz nozzle operates in conjunction with a radiofrequency heating coil. Since the quartz nozzle operates in conjunction with the radiofrequency heating coil, the temperature of the molten metal can be kept constant when the position of the quartz nozzle is regulated. It was confirmed by X-ray diffraction (XRD) that the produced ribbon was amorphous.

(Nanocrystallization of Ribbon of Fe-Based Amorphous Alloy by Heat Treatment)

(Example)

The above-described ribbon of Fe-based amorphous alloy was cut into a length of 70 mm.

As shown in FIG. 1 and FIG. 2, a plurality of ribbons 10 were wrapped by being sandwiched between a pair of titanium (Ti) foils 11, 11, each having a thickness of 100 μm, which had a larger area compared with the plurality of ribbons 10, thereby producing a heat treatment sample 1.

Subsequently, as shown in FIG. 3, a pair of metal blocks 2, 2, which had previously been heated in a furnace set at 480° C., were disposed, such that heating surfaces 21, 21 faced to each other. The heat treatment sample 1 was disposed between the pair of heating bodies 2, 2, and was then sandwiched by pair from both sides of the thickness direction of ribbons 10. Then, the heat treatment sample 1 was retained for 3 seconds, such that it was heat-treated. The heat treatment was carried out in the ambient atmosphere.

After completion of the heat treatment, the ribbons 10 in the titanium foils 11,11 were corrected from the sample 1, and the corrected ribbons 10 were used as a soft magnetic material of the Example, which was then evaluated as follows.

Using a vibrating sample magnetmeter (VSM), the saturation magnetization of the soft magnetic material was measured (maximum applied magnetic field: 10 kOe).

Using a direct current BH analyzer, the coercive force of the soft magnetic material was measured.

According to an XRD analysis, the crystal phase of the soft magnetic material was identified, and the particle diameter of αFe crystal grains was measured. Herein, the particle diameter of αFe crystal grains was calculated by the Scherrer method.

The thickness of an oxide layer ($Fe_2O_3$) on the surface of the soft magnetic material was measured by field emission scanning auger electron spectroscopy (FE-AES).

(Comparative Example 1)

A soft magnetic material of Comparative Example 1 was produced under the same conditions as those applied in the above-described Example, with the exception that a pair of copper foils with a thickness of 75 μm were used instead of the pair of titanium foils 11,11 in the Example.

The soft magnetic material of Comparative Example 1 was evaluated in the same manner as that for the soft magnetic material of the above-described Example.

(Comparative Example 2)

A soft magnetic material of Comparative Example 2 was produced under the same conditions as those applied in the above-described Example, with the exception that Fe-based amorphous alloy ribbons 10, which were not wrapped with the titanium foils 11, 11, were used as a heat treatment sample 1, which was sandwiched between a pair of metal blocks 2, 2 and were then heat-treated in the Example.

The soft magnetic material of Comparative Example 2 was evaluated in the same manner as that for the soft magnetic material of the above-described Example.

(Results)

Figure 4:
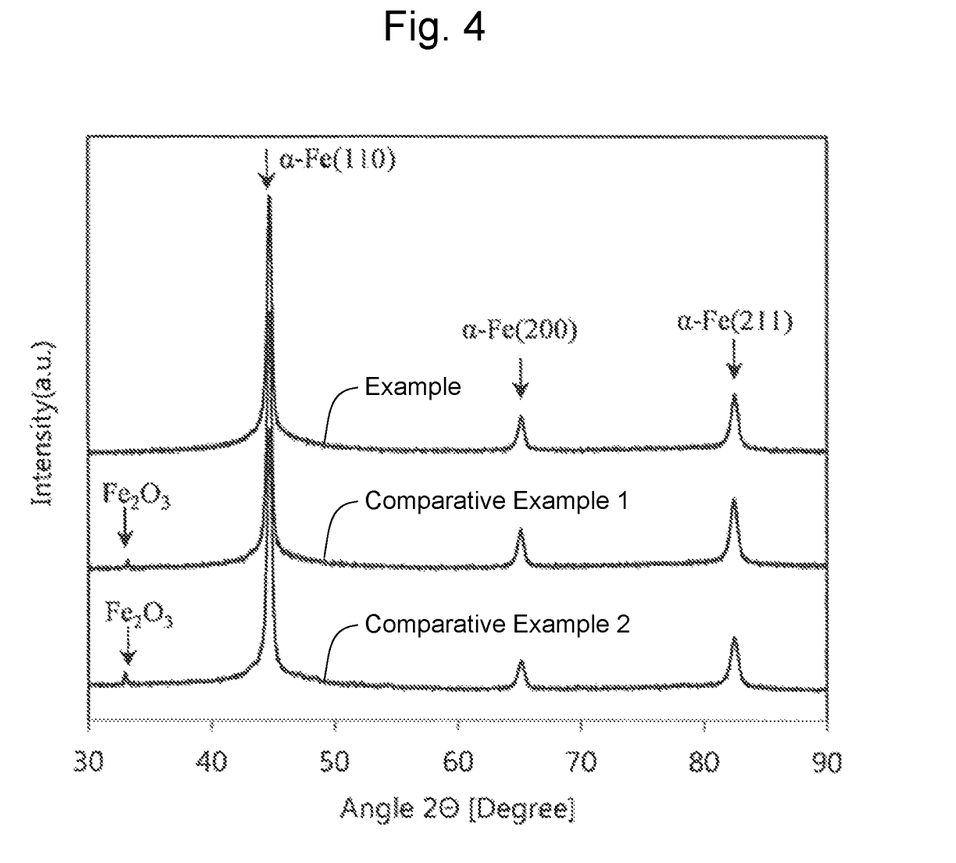
FIG. 4 shows the results of an X-ray diffraction performed on soft magnetic materials obtained in Example (a heat treatment on Fe-based amorphous ribbons wrapped with titanium foils), Comparative Example 1 (a heat treatment on Fe-based amorphous ribbons wrapped with copper foils), and Comparative Example 2 (a heat treatment on Fe-based amorphous ribbons).

The evaluation results of each soft magnetic material are shown in Table 1, and the results of the X-ray diffraction are shown in FIG. 4.

TABLE 1

| Heat treatment sample | | Identification of oxide layer by XRD | Thickness of oxide layer [nm] | Particle diameter of αFe crystal [nm] | Saturation magnetization [T] | Coercive force [A/m] |
|---|---|---|---|---|---|---|
| Example | Ribbon wrapped with Ti foil | Non | 9 | 21.4 | 1.90 | 9.6 |
| Comparative Example 1 | Ribbon wrapped with Cu foil | $Fe_2O_3$ peak | 60 | 21.6 | 1.87 | 10.1 |
| Comparative Example 2 | Only ribbon | $Fe_2O_3$ peak | 64 | 21.2 | 1.87 | 9.9 |

It was confirmed that the soft magnetic material of the Example, in which the Fe-based amorphous alloy ribbons were wrapped with the titanium foils and were then heat-treated, had high saturation magnetization, in comparison to the soft magnetic material of the Comparative Example 1, in which the Fe-based amorphous alloy ribbons were wrapped with the copper foils and were then heat-treated, and the soft magnetic material of the Comparative Example 2, in which the Fe-based amorphous alloy ribbons were directly heat-treated.

A peak of $Fe_2O_3$ was not observed in the soft magnetic material of the Example according to XRD, and the thickness of the oxide layer on the surface thereof (the thickness of one side) was 9 nm. On the other hand, a peak of $Fe_2O_3$ was observed in the soft magnetic material of Comparative Example 1 and in the soft magnetic material of Comparative Example 2 according to XRD, and the thicknesses of the oxide layers on the surface were 60 nm and 64 nm, respectively. From these results, it is assumed that high saturation magnetization of the soft magnetic material of the Example would be caused by the fact that an oxide layer is not formed on the surface thereof. Hence, it was confirmed that heat-treating the Fe-based amorphous alloy wrapped with titanium foils can suppress the formation of the oxide layer, even when the heat-treating is conducted in the ambient atmosphere, and that the heat-treating can produce a nanocrystalline soft magnetic material having high saturation magnetization.

DESCRIPTION OF SYMBOLS

1: Heat treatment sample
10: Fe-based amorphous ribbon
11: Sheet (titanium foil)
2: Heating body (block)
21: Heating surface

What is claimed is:

1. A method for producing a soft magnetic material, comprising
    heat-treating a Fe-based amorphous alloy to form a crystal phase,
    wherein
    the heat-treating is carried out in a state in which the alloy is wrapped with a sheet comprising one or more substances having a standard Gibbs energy of formation of an oxide thereof that is larger in a negative direction than Fe, and
    the one or more substances is a least one selected from the group consisting of Ti, Si, Al, and Zr.

2. The method according to claim 1, wherein
    the alloy is a ribbon of Fe-based amorphous alloy, and
    the heat-treating comprises sandwiching a heat treatment sample comprising the ribbon wrapped with the sheet between a pair of heating bodies from the both sides of the thickness direction of the ribbon, wherein each heating body comprises a heating surface that comes into contact with the heat treatment sample to heat it, and the heating bodies are disposed such that the heating surfaces face to each other.

3. The method according to claim 1, wherein the heat-treating is carried out in the atmosphere.

* * * * *